(12) United States Patent
Mathrani (10) Patent No.: US 12,468,722 B1
(45) Date of Patent: Nov. 11, 2025

(54) SYSTEM, METHOD, AND COMPUTER PROGRAM FOR AUTOSCALING DATA LAKE CONNECTIONS

(71) Applicant: Amdocs Development Limited, Limassol (CY)

(72) Inventor: Kevin Mathrani, Pune (IN)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 0 days.

(21) Appl. No.: 18/088,455

(22) Filed: Dec. 23, 2022

(51) Int. Cl.
*G06F 16/25* (2019.01)

(52) U.S. Cl.
CPC .................. *G06F 16/254* (2019.01)

(58) Field of Classification Search
CPC .................................................. G06F 16/254
See application file for complete search history.

(56) References Cited

U.S. PATENT DOCUMENTS

| | | | |
|---|---|---|---|
| 2015/0276925 A1* | 10/2015 | Scholten | G01S 15/02 702/150 |
| 2019/0243913 A1* | 8/2019 | Chkodrov | G06F 16/2455 |
| 2022/0012363 A1* | 1/2022 | Colcord | G06F 16/2457 |
| 2022/0350617 A1* | 11/2022 | Hotham | H04L 67/10 |
| 2022/0413939 A1* | 12/2022 | Chandrasekaran | G06F 9/5022 |

\* cited by examiner

*Primary Examiner* — Charles D Adams
(74) *Attorney, Agent, or Firm* — Zilka-Kotab, P.C.

(57) ABSTRACT

As described herein, a system, method, and computer program are provided for autoscaling data lake connections. One or more metrics defining a load on one or more data sources included in a data lake are collected. A plurality of processes configured to connect to the data lake to retrieve data therefrom are automatically scaled, as a function of the one or more metrics.

9 Claims, 6 Drawing Sheets

100

102 — collect one or more metrics defining a load on one or more data sources included in a data lake 104 — automatically scale a plurality of processes configured to connect to the data lake to retrieve data therefrom, as a function of the one or more metrics

SYSTEM, METHOD, AND COMPUTER PROGRAM FOR AUTOSCALING DATA LAKE CONNECTIONS

FIELD OF THE INVENTION

The present invention relates to managing access to data lakes.

BACKGROUND

Computer processes, which may be part of a computer application or service, can be configured to load and read from a data lake. In general, a data lake is a centralized repository that stores structured and/or unstructured data at any scale. For example, extract, transform, and load (ETL) processes can be configured to collect (extract) data from one or more various types of data sources included in the data lake, such as databases, files, event streaming messaging systems (e.g. Kafka), etc. These processes, when run, utilize cloud resources to collect the data, which involves some cost. Some of the resources that may be used include processors (e.g. central processing units (CPUs), memory, input/output interfaces (I/O), storage, etc.

Due to the shared nature of the cloud resources, resource usage rates may not always be optimal as they are a function of the processes that are running at any given time. Unmanaged load on the cloud resources will result in sub-optimal usage and, in turn, increased cost. There is thus a need for addressing these and/or other issues associated with the prior art.

SUMMARY

As described herein, a system, method, and computer program are provided for autoscaling data lake connections. One or more metrics defining a load on one or more data sources included in a data lake are collected. A plurality of processes configured to connect to the data lake to retrieve data therefrom are automatically scaled, as a function of the one or more metrics.

DETAILED DESCRIPTION

Figure 1:
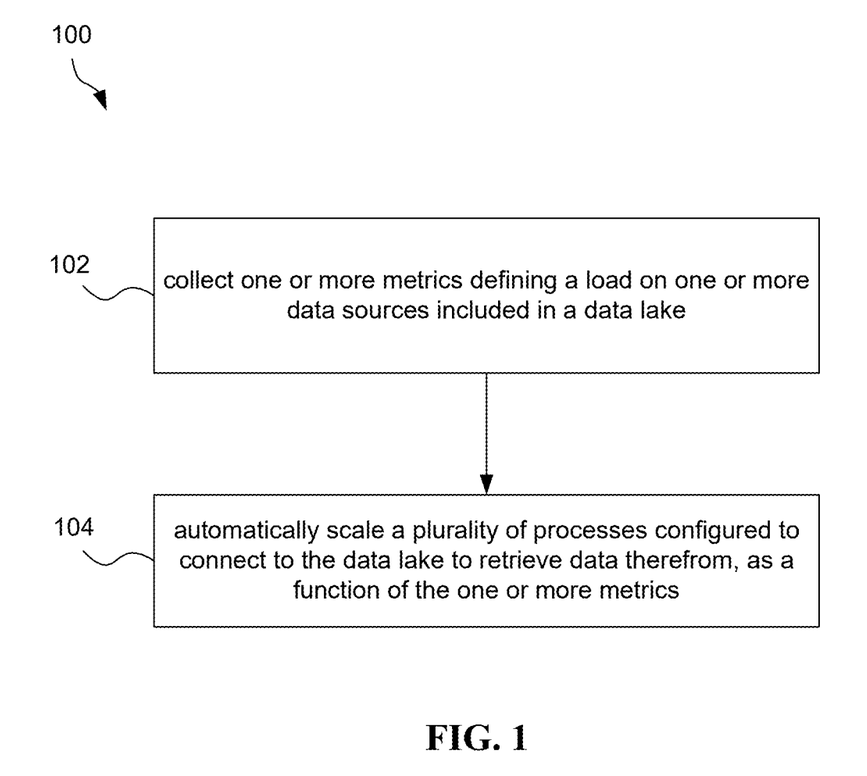
FIG. 1 illustrates a flowchart of a method for autoscaling data lake connections, in accordance with one embodiment.

FIG. 1 illustrates a flowchart of a method 100 for autoscaling data lake connections, in accordance with one embodiment. The method 100 may be performed by any computer system described below with respect to FIGS. 5 and/or 6. In an embodiment, the method 100 may be performed by a cloud-based platform on which a plurality of processes (described herein) run. In another embodiment, the method 100 may be performed by an on-premises platform on which the plurality of processes run.

In operation 102, one or more metrics defining a load on one or more data sources included in a data lake are collected. The data lake refers to any centralized repository having one or more data sources that are made accessible to various processes. The data lake may be located in a cloud (i.e. the cloud-based platform), in one embodiment.

Further, the data sources refer to any components of the data lake that store data capable of being accessed by the processes. For example, each of the data sources may be a database, a file, a file directory, an event streaming messaging system, etc. Thus, in an embodiment, the data lake may include any combination of different data sources.

As mentioned above, one or more metrics defining a load on the one or more data sources are collected. The metrics refer to any measurement of a load on the one or more data sources. The load refers to an amount of usage of the data sources. In an embodiment, a separate metric may be collected per data source.

In an embodiment, the one or more metrics may represent input traffic to the one or more data sources. For example, in an embodiment, the one or more metrics may include a number of files pending to be processed from one or more file directories included in the data lake. As another example, in an embodiment, the one or more metrics may include a number of messages pending to be processed by an event streaming messaging system included in the data lake.

It should be noted that the one or more metrics may be collected by monitoring the one or more data sources, including for example measuring the input traffic to the one or more data sources. The monitoring may be performed by the platform on which the method 100 is performed, in an embodiment. In another embodiment, the monitoring may be performed by a separate monitoring tool, in which case the one or more metrics may be collected from the monitoring tool.

In operation 104, a plurality of processes configured to connect to the data lake to retrieve data therefrom are automatically scaled, as a function of the one or more metrics. The processes refer to any computer code being executed (e.g. a task) which is configured to connect to the data lake to retrieve data therefrom. In an embodiment, the processes are components of an application. In an embodiment, the processes are executing as containers.

As mentioned above, the processes are automatically scaled as a function of the one or more metrics. In an embodiment, the automatic scaling may be performed based on a policy applied to the one or more metrics. For example, the policy may automatically scale the plurality of processes to manage the load on the one or more data sources included in the data lake.

In an embodiment, automatically scaling the plurality of processes may include scaling down the plurality of processes when the load on the one or more data sources included in the data lake is below a defined threshold. Scaling down the plurality of processes may include deleting at least one process of the plurality of processes. In another embodiment, automatically scaling the plurality of processes may include scaling up the plurality of processes when the load on the one or more data sources included in the data lake is above a defined threshold. Scaling up the plurality of processes may include adding at least one new process to the plurality of processes.

To this end, the method 100 may be performed to provide autoscaling of data lake connections, or in other words to automatically scale a number of executing processes that are configured to connect to the data lake. In an embodiment, the processes may be executing via batch processing. In another embodiment, the processes may be executing via real time streaming processing. In either case, but especially with streaming processes, the input data loads can fluctuate based on factors such a time of day (e.g. either business hours or off peak hours). The present method 100, which provides an automatic scaling of the processes as a reaction to these varying loads, may allow for use of resources (e.g. processors, memory, etc.) by these processes to be optimized and in turn may reduce cost resulting from resource usage.

In an embodiment, the method 100 may also include detecting a change made to the plurality of processes as a result of the automatic scaling, and further reconfiguring the changed plurality of processes. In another embodiment, the method 100 may also include detecting changes to a configmap of an application that includes the plurality of processes, and re-deploying the application responsive detecting the changes.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
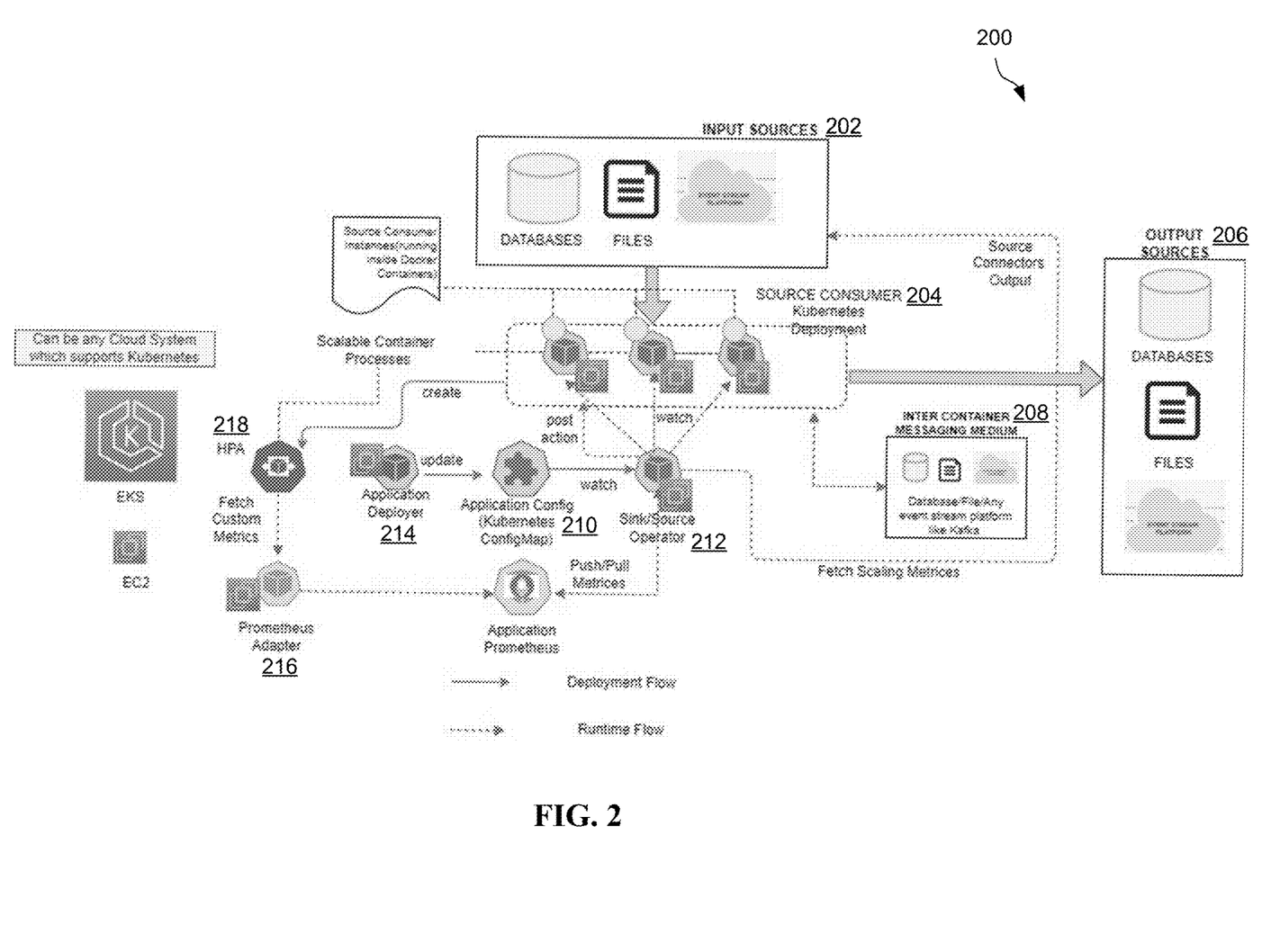
FIG. 2 illustrates a block diagram of a system for autoscaling data lake connections, in accordance with one embodiment.

FIG. 2 illustrates a block diagram of a system 200 for autoscaling data lake connections, in accordance with one embodiment. As an option, the system 200 may be implemented in the context of the details of the previous figure and/or any subsequent figure(s). Of course, however, the system 200 may be implemented in the context of any desired environment. Further, the aforementioned definitions may equally apply to the description below.

The system 200 of the present embodiment is illustrated as being deployed on an Amazon Web Services™ (AWS) platform. There are 2 flows shown:
1) Deployment flow which creates the required processes
2) Run time flow which shows the flow of data and functional invocation occurring across components of the cloud platform.

The system includes the following components with corresponding functionality:

INPUT SOURCES 202: These are the sources of data, e.g.: Database, Files, Messaging System.

SOURCE CONSUMER 204 Kubernetes Deployment: This is for an instance the ETL application which is configured and defined as a Kubernetes deployment. The main logic of the application runs inside Kubernetes Containers and is orchestrated by any Cloud Container Management Service (e.g.: Amazon Elastic Kubernetes Service™ (EKS)). The application has consumers which source data from the input sources 202 and the objective of the system 200 is to optimize the number of such container processes.

OUTPUT SOURCES 206: The application produces an output which is published or stored to an output store, e.g.: Database, Files, Messaging System.

INTER CONTAINER MESSAGING MEDIUM 208: This is a medium through which the Container processes communicate and share information with each other. This is needed since there is a distribution of source data across container processes and each process should process its own unique set of data so that there is duplicate processing of data across processes and parallel processing is achieved efficiently.

APPLICATION CONFIGURATION 210: This is a Kubernetes ConfigMap which contains all configuration of the application.

SOURCE OPERATOR 212: This is a process which is again a Kubernetes deployment whose main functions are below:

a. The First function is to Fetch the Scaling Metrics from Sources. These metrics are values which represent the input traffic such as Number of files pending to be processed from a file directory/set of directories and/or number of messages pending to be processed in Kafka topics. These metrics will be used in order to make a decision on whether the existing number of container processes are optimized in order to process the pending load. These metrics are made available to Prometheus either in push or pull mode.

b. The Second function (optional) is to watch for any changes to the application configmap and re-deploy the application.

c. The Third function (optional) is to watch for any addition or deletion of container processes as part of the Scaling activity and perform a post action, e.g.: for an application which uses Kafka Connect which controls the configuration of the consumers, this step would be needed to reconfigure.

APPLICATION DEPLOYER 214: The deployer is a process which sets up the Consumer Application and can be integrated in a Complete Deployment pipeline Prometheus & Prometheus Adapter 216: The Scaling Metrics are pushed to Prometheus or pulled by Prometheus and made available to the consumers of metrics via the Prometheus Adapter 9) Austoscaler (HPA) 218: This is functionality provided by Kubernetes which is a process which reacts to the change in Source load and is used to increase (scale out) or decrease (scale in) the number of Application Containers.

Figure 3:
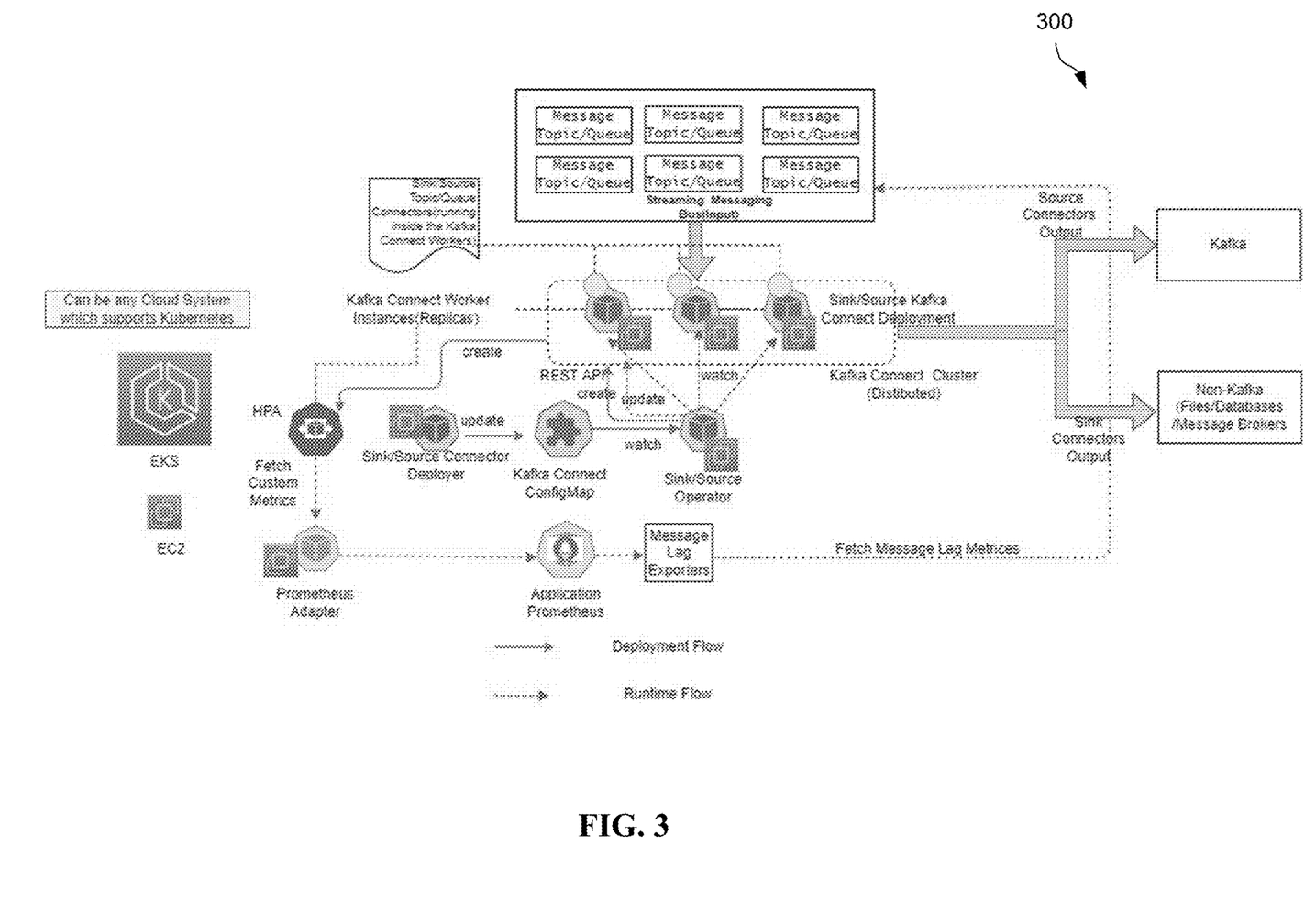
FIG. 3 illustrates a block diagram of a system for autoscaling data lake connections which includes a Kafka connect framework, in accordance with one embodiment.

FIG. 3 illustrates a block diagram of a system 300 for autoscaling data lake connections which includes a Kafka connect framework, in accordance with one embodiment. As an option, the system 300 may be implemented in the context of the details of the previous figure and/or any subsequent figure(s). Of course, however, the system 300 may be implemented in the context of any desired environment. Further, the aforementioned definitions may equally apply to the description below.

The system 300 of the present embodiment is an implementation of the system 200 of FIG. 2, but adds the Kafka Connect Framework which is used to create Sink and Source Connectors. The system 300 also uses an Event Streaming Platform (e.g.: Kafka) as Source).

Figure 4:
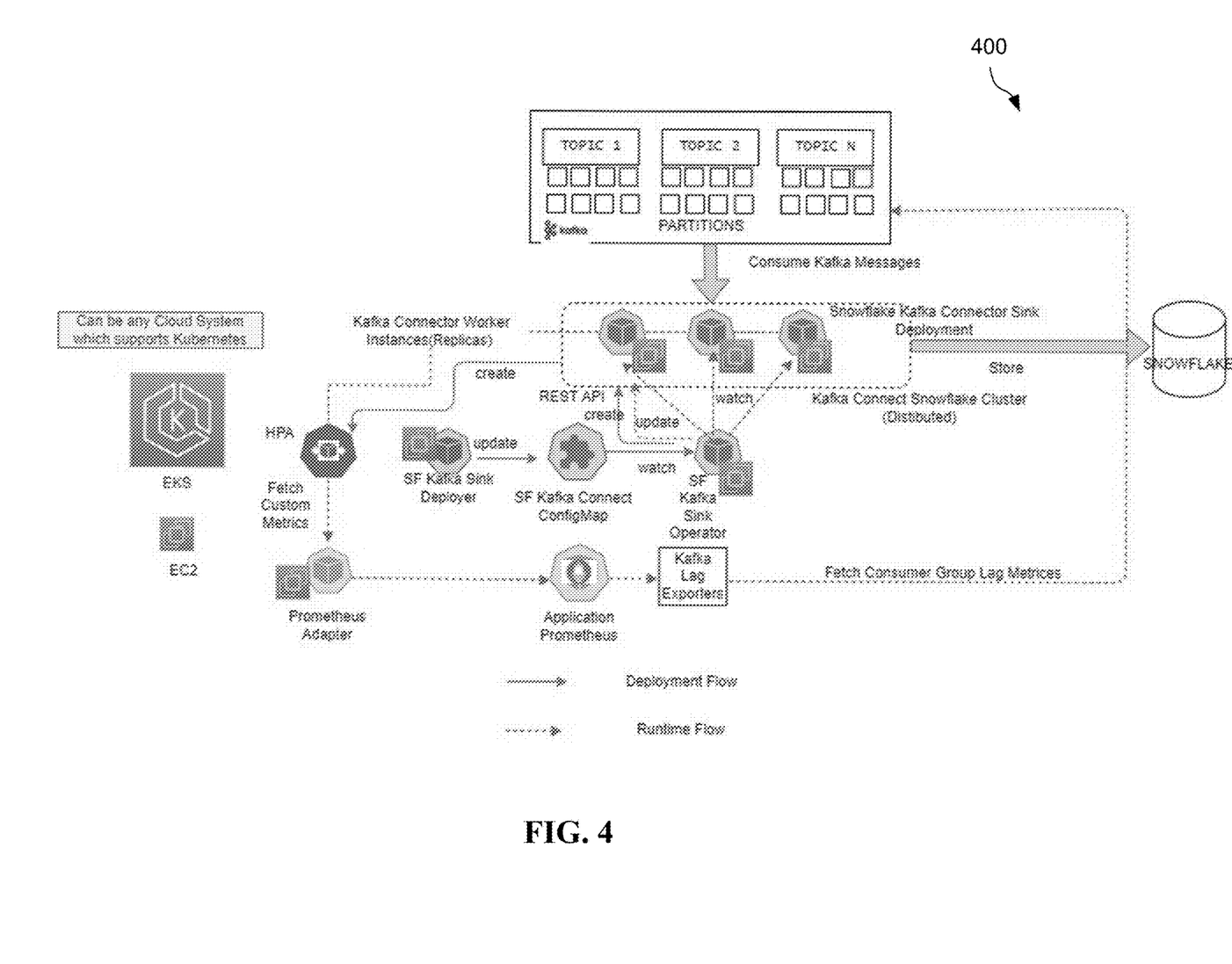
FIG. 4 illustrates a block diagram of a system for autoscaling data lake connections which includes Kafka as data source and snowflake as a target store, in accordance with one embodiment.

FIG. 4 illustrates a block diagram of a system 400 for autoscaling data lake connections which includes Kafka as data source and snowflake as a target store, in accordance with one embodiment. As an option, the system 400 may be implemented in the context of the details of the previous figure and/or any subsequent figure(s). Of course, however, the system 400 may be implemented in the context of any desired environment. Further, the aforementioned definitions may equally apply to the description below.

The system 400 of the present embodiment is a more specific implementation of the system 200 of FIG. 2 with Kafka as Source and Snowflake as the Target Store. The Snowflake Kafka Connector is deployed as a Sink Kafka Connector.

Figure 5:
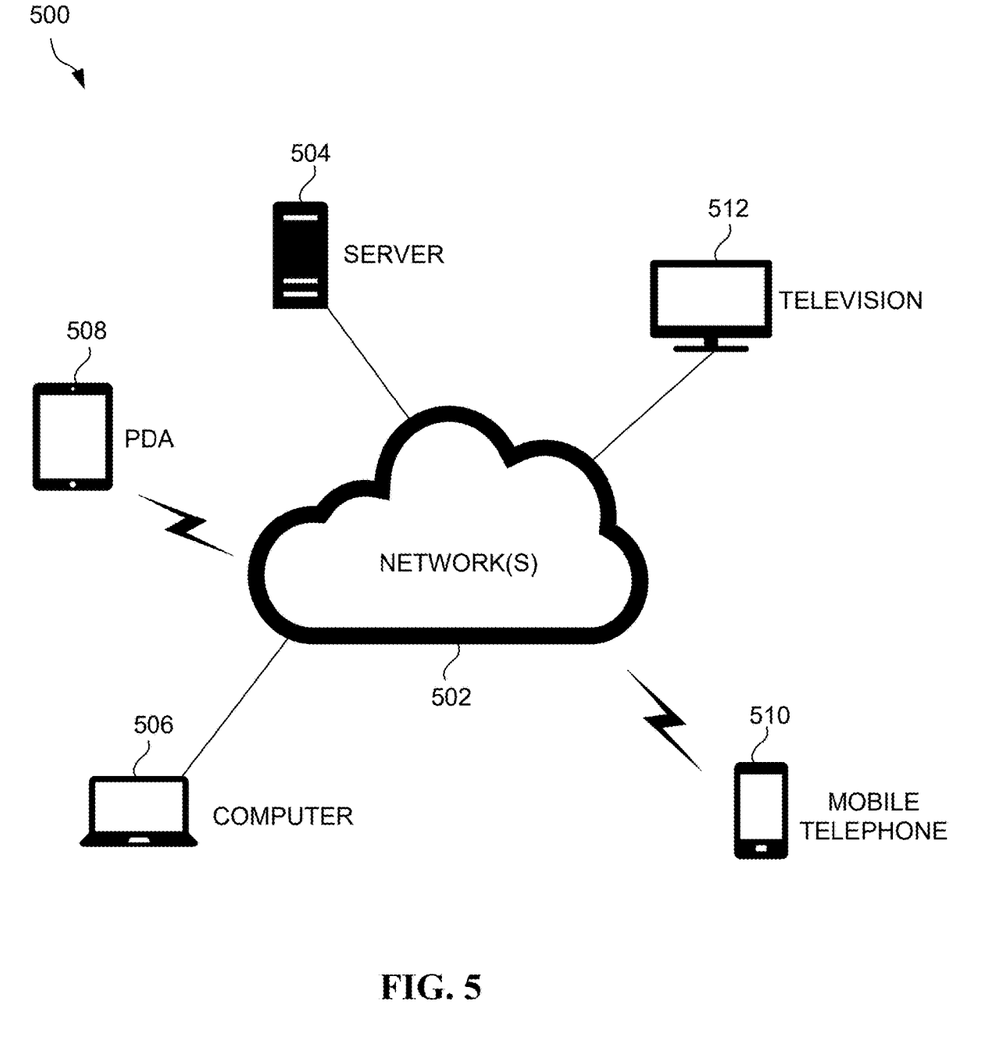
FIG. 5 illustrates a network architecture, in accordance with one possible embodiment.
Figure 6:
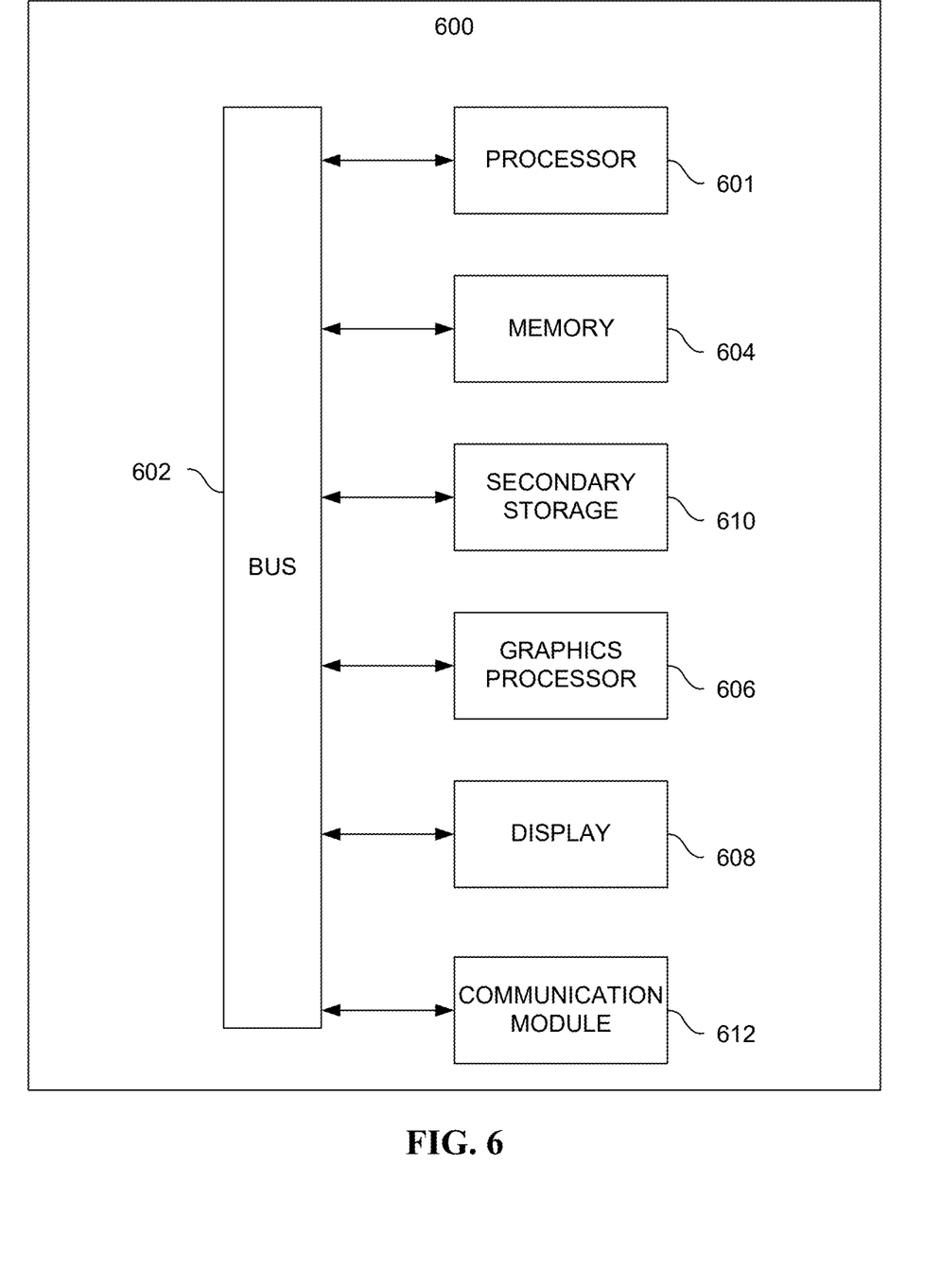
FIG. 6 illustrates an exemplary system, in accordance with one embodiment.

FIG. 5 illustrates a network architecture 500, in accordance with one possible embodiment. As shown, at least one network 502 is provided. In the context of the present network architecture 500, the network 502 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 502 may be provided.

Coupled to the network 502 is a plurality of devices. For example, a server computer 504 and an end user computer 506 may be coupled to the network 502 for communication purposes. Such end user computer 506 may include a desktop computer, lap-top computer, and/or any other type of logic. Still yet, various other devices may be coupled to the network 502 including a personal digital assistant (PDA) device 508, a mobile phone device 510, a television 512, etc.

FIG. 6 illustrates an exemplary system 600, in accordance with one embodiment. As an option, the system 600 may be implemented in the context of any of the devices of the network architecture 500 of FIG. 5. Of course, the system 600 may be implemented in any desired environment.

As shown, a system 600 is provided including at least one central processor 601 which is connected to a communication bus 602. The system 600 also includes main memory 604 [e.g. random access memory (RAM), etc.]. The system 600 also includes a graphics processor 606 and a display 608.

The system 600 may also include a secondary storage 610. The secondary storage 610 includes, for example, solid state drive (SSD), flash memory, a removable storage drive, etc. The removable storage drive reads from and/or writes to a removable storage unit in a well-known manner.

Computer programs, or computer control logic algorithms, may be stored in the main memory 604, the secondary storage 610, and/or any other memory, for that matter. Such computer programs, when executed, enable the system 600 to perform various functions (as set forth above, for example). Memory 604, storage 610 and/or any other storage are possible examples of non-transitory computer-readable media.

The system 600 may also include one or more communication modules 612. The communication module 612 may be operable to facilitate communication between the system 600 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer-readable media storing computer instructions which when executed by one or more processors of a device cause the device to:
   for each of a plurality of data sources that store data and that are included in a data lake, measure an amount of input traffic to the data source by a process configured as a first Kubernetes deployment;
   determining a plurality of executing processes of an application that are configured to connect to the data lake to retrieve data therefrom, wherein the application is configured as a second Kubernetes deployment with logic that runs inside a Kubernetes container which is orchestrated by a Cloud Container Management Service, and wherein the plurality of executing processes are consumers of the plurality of data sources;
   automatically scale the plurality of executing processes of the application, using Kubernetes autoscaling functionality, wherein the plurality of executing processes are automatically scaled to form a new set of executing processes for the application including:
      scaling down the plurality of executing processes when the amount of input traffic measured for one or more of the plurality of data sources is below a first defined threshold, and
      scaling up the plurality of executing processes when the amount of input traffic measured for one or more of the plurality of data sources is above a second defined threshold;
   reconfigure the executing processes in the new set of executing processes;
   detect changes to a Kubernetes ConfigMap which contains a configuration of the application, by the process configured as the first Kubernetes deployment;
   re-deploy the application responsive detecting the changes, by the process configured as the first Kubernetes deployment;
   distribute the plurality of data sources across the new set of executing processes to cause each process in the new set of executing processes to access the data source distributed thereto;
   wherein the new set of executing processes communicate with one another and share information via an inter-process messaging medium of the Kubernetes container;
   wherein the application uses the new set of executing processes to generate an output that is stored to an output source.

2. The non-transitory computer-readable media of claim 1, wherein the plurality of data sources included in the data lake include at least one of:
   a database,
   a file,
   a file directory, or
   an event streaming messaging system.

3. The non-transitory computer-readable media of claim 1, wherein the input traffic includes a number of files pending to be processed from one or more file directories included in the data lake.

4. The non-transitory computer-readable media of claim 1, wherein the input traffic includes a number of messages pending to be processed by an event streaming messaging system included in the data lake.

5. The non-transitory computer-readable media of claim 1, wherein the automatic scaling is performed based on a policy applied to the input traffic.

6. The non-transitory computer-readable media of claim 5, wherein the policy automatically scales the plurality of processes to manage a load on the plurality of data sources included in the data lake.

7. The non-transitory computer-readable media of claim 1, wherein each process in the new set of processes is configured to process its own unique set of data in the data lake such that there is duplicate processing of data across processes in the new set of processes.

8. A method, comprising:
   at a computer system;
   for each of a plurality of data sources that store data and that are included in a data lake, measuring an amount of input traffic to the data source by a process configured as a first Kubernetes deployment;
   determining a plurality of executing processes of an application that are configured to connect to the data lake to retrieve data therefrom, wherein the application is configured as a second Kubernetes deployment with logic that runs inside a Kubernetes container which is orchestrated by a Cloud Container Management Service, and wherein the plurality of executing processes are consumers of the plurality of data sources;
   automatically scaling the plurality of executing processes of the application, using Kubernetes autoscaling functionality, wherein the plurality of executing processes are automatically scaled to form a new set of executing processes for the application including:
  scaling down the plurality of executing processes when the amount of input traffic measured for one or more of the plurality of data sources is below a first defined threshold, and
  scaling up the plurality of executing processes when the amount of input traffic measured for one or more of the plurality of data sources is above a second defined threshold;
reconfiguring the executing processes in the new set of executing processes;
detecting changes to a Kubernetes ConfigMap which contains a configuration of the application, by the process configured as the first Kubernetes deployment;
re-deploying the application responsive detecting the changes, by the process configured as the first Kubernetes deployment;
distributing the plurality of data sources across the new set of executing processes to cause each process in the new set of executing processes to access the data source distributed thereto;
wherein the new set of executing processes communicate with one another and share information via an inter-process messaging medium of the Kubernetes container;
wherein the application uses the new set of executing processes to generate an output that is stored to an output source.

9. A system, comprising:
a non-transitory memory storing instructions; and
one or more processors in communication with the non-transitory memory that execute the instructions to:
for each of a plurality of data sources that store data and that are included in a data lake, measure an amount of input traffic to the data source by a process configured as a first Kubernetes deployment;
determine a plurality of executing processes of an application that are configured to connect to the data lake to retrieve data therefrom, wherein the application is configured as a second Kubernetes deployment with logic that runs inside a Kubernetes container which is orchestrated by a Cloud Container Management Service, and wherein the plurality of executing processes are consumers of the plurality of data sources;
automatically scale the plurality of executing processes of the application, using Kubernetes autoscaling functionality, wherein the plurality of executing processes are automatically scaled to form a new set of executing processes for the application including:
  scaling down the plurality of executing processes when the amount of input traffic measured for one or more of the plurality of data sources is below a first defined threshold, and
  scaling up the plurality of executing processes when the amount of input traffic measured for one or more of the plurality of data sources is above a second defined threshold;
reconfigure the executing processes in the new set of executing processes;
detect changes to a Kubernetes ConfigMap which contains a configuration of the application, by the process configured as the first Kubernetes deployment;
re-deploy the application responsive detecting the changes, by the process configured as the first Kubernetes deployment;
distribute the plurality of data sources across the new set of executing processes to cause each process in the new set of executing processes to access the data source distributed thereto;
wherein the new set of executing processes communicate with one another and share information via an inter-process messaging medium of the Kubernetes container;
wherein the application uses the new set of executing processes to generate an output that is stored to an output source.

* * * * *